United States Patent [19]
Rogers

[11] 3,802,304
[45] Apr. 9, 1974

[54] CONTOURING UNIT FOR MACHINE TOOLS

[76] Inventor: Charles L. Rogers, 16539 Brass Lantern, La Mirada, Calif. 90638

[22] Filed: Oct. 4, 1971

[21] Appl. No.: 186,328

[52] U.S. Cl. ............... 82/14 A, 82/1.3, 90/13.5, 408/3
[51] Int. Cl. ............................ B23b 3/28
[58] Field of Search ............... 82/14 A, 1.3; 408/3; 90/13.5

[56] References Cited
UNITED STATES PATENTS

| 3,237,486 | 3/1966 | Gilbert et al. | 82/2 E |
| 3,152,394 | 10/1964 | Miller et al. | 82/2 E |
| 3,614,250 | 10/1971 | Connolly et al. | 408/3 |

*Primary Examiner*—Leonidas Vlachos
*Attorney, Agent, or Firm*—William P. Green

[57] ABSTRACT

A unit for machining a contoured bore or other surface on a workpiece, and including a rotary power driven head having a cutter carrying slide which is movable transversely of the axis of rotation of the head by a powered mechanism under the control of a stylus following a contoured template, with feedback of the motion of the slide to the stylus being effected through feedback means having a portion turning with the head.

19 Claims, 14 Drawing Figures

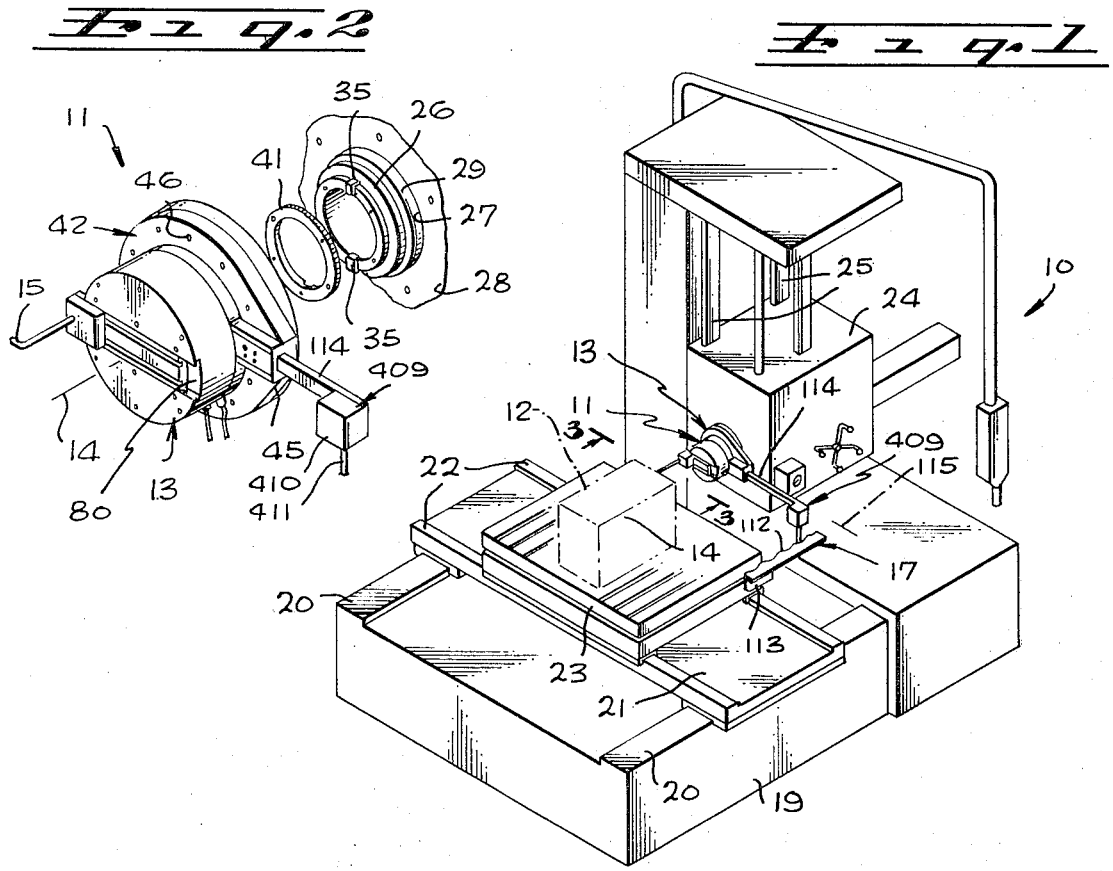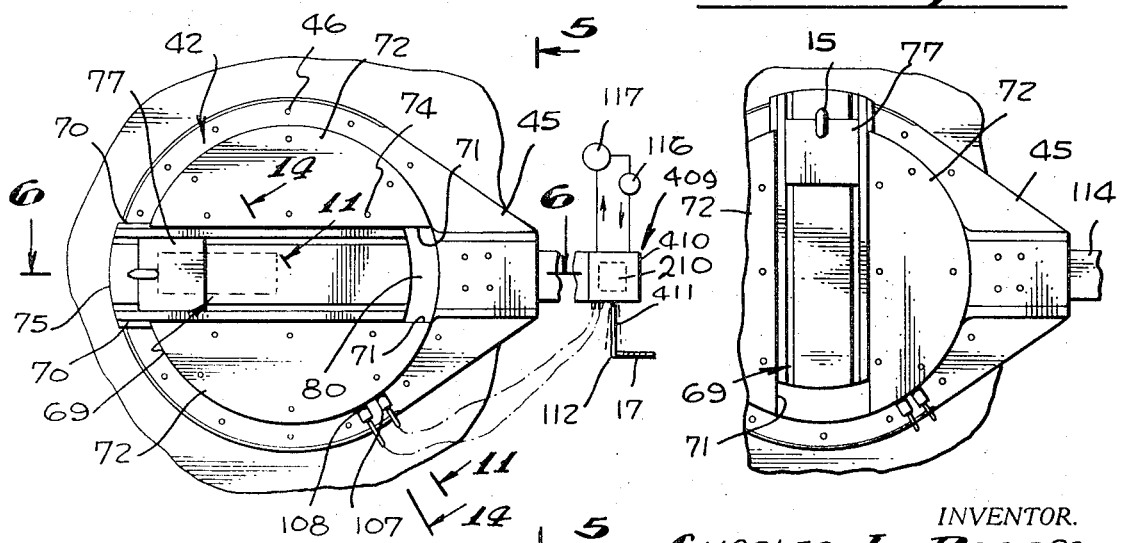

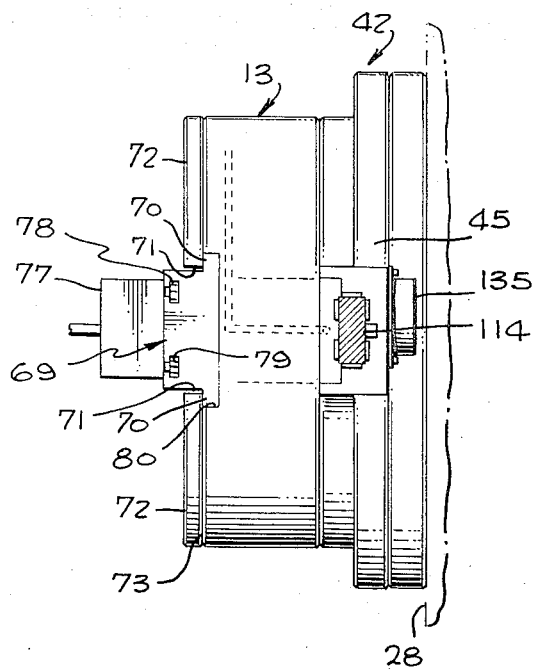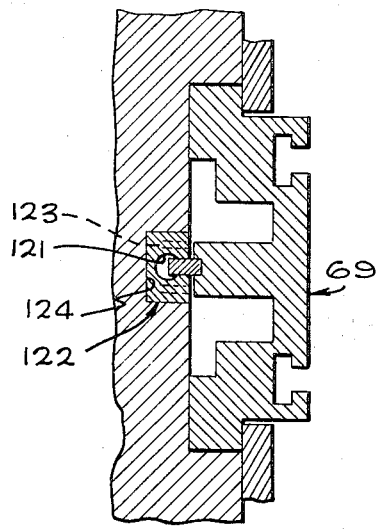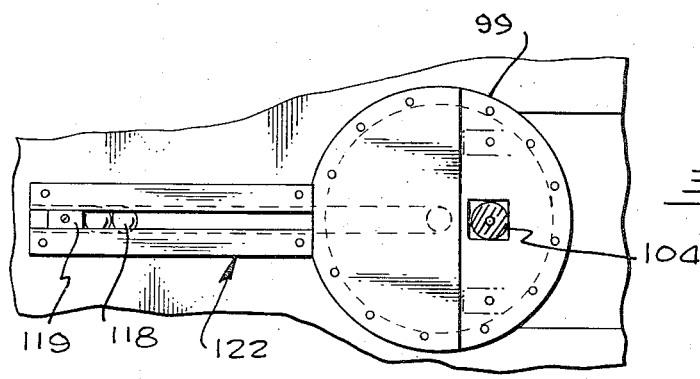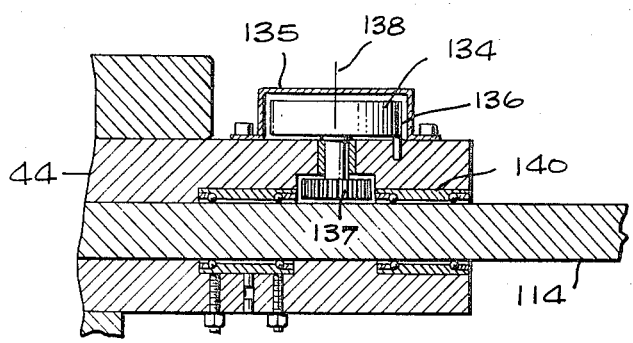

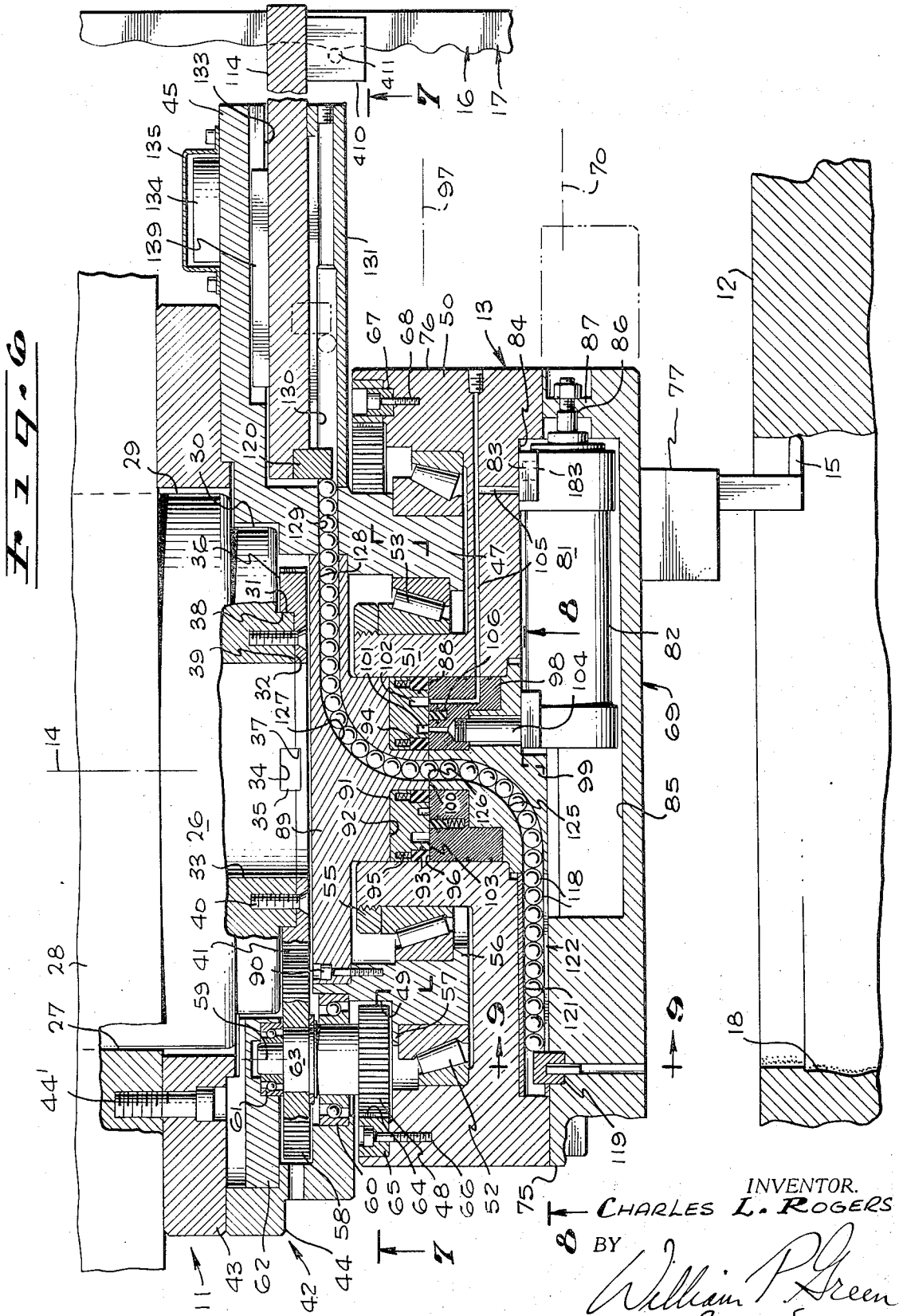

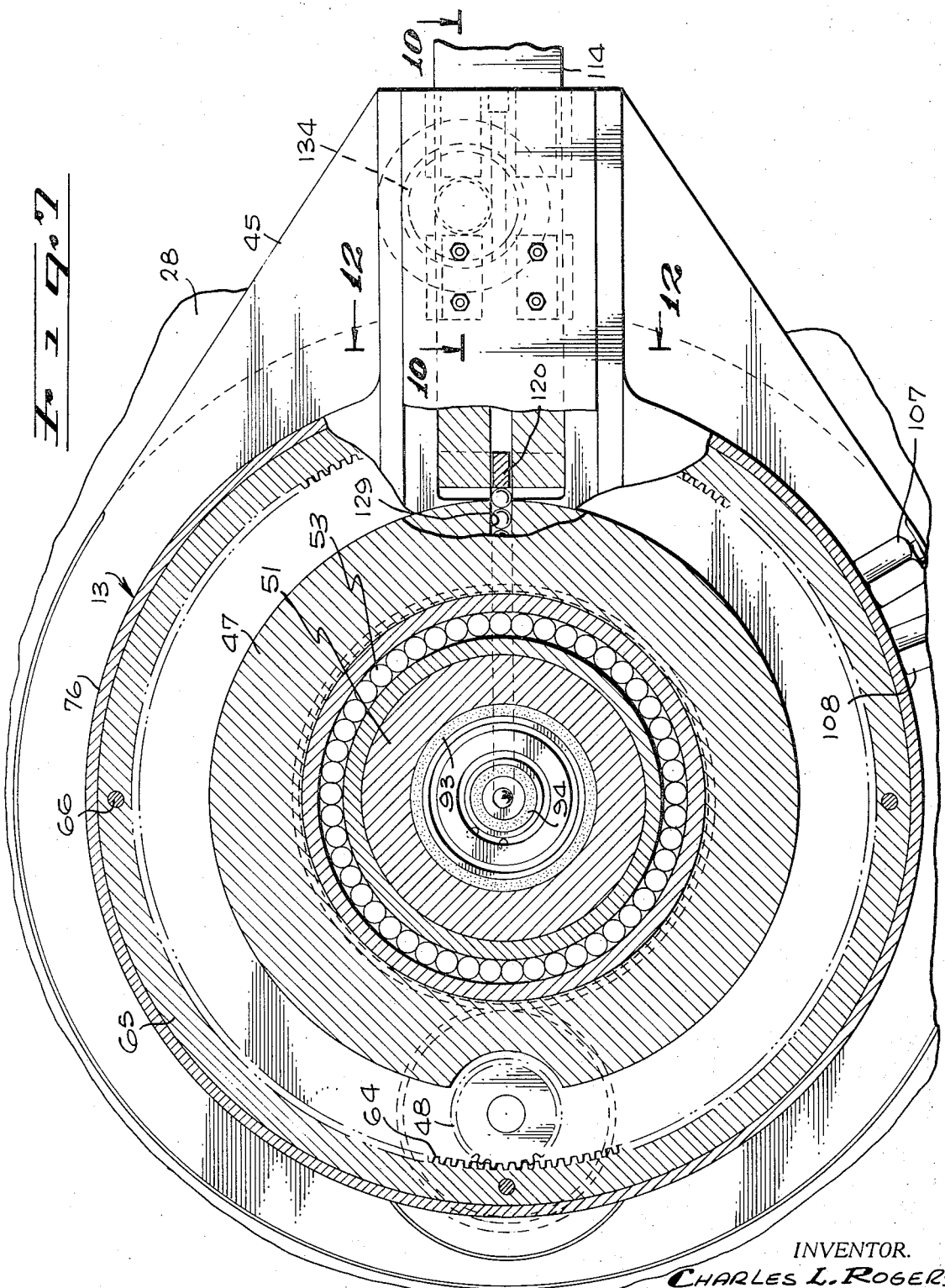

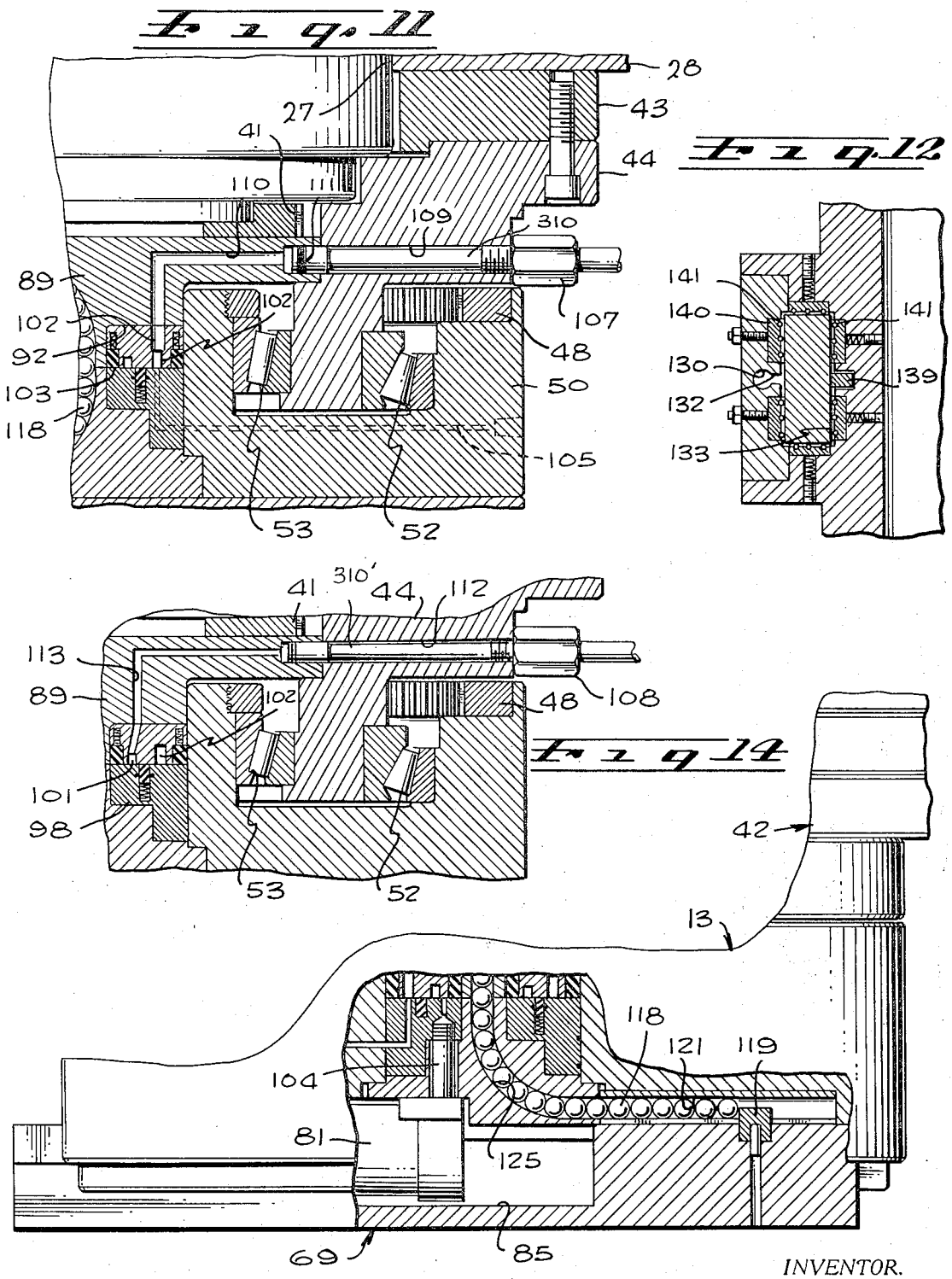

3,802,304

CONTOURING UNIT FOR MACHINE TOOLS

BACKGROUND OF THE INVENTION

This invention relates generally to improved apparatus for enabling the machining of contoured bores and contoured external surfaces of circular cross section on a workpiece with a horizontal milling machine or other machine tool in which the cutting tool but not the workpiece is rotated.

In machining a contoured bore or other contoured surface of circular cross section by conventional methods, it is customary to employ a machine tool of the type in which a workpiece is bodily rotated while the cutting tool does not turn. The machine tools commonly in use in industry are not capable of machining such a contoured circular surface without thus swinging the workpiece itself around an axis. This procedure, however, is in many cases extremely inconvenient, particularly where the workpiece is very large in size and therefore requires a very large capacity machine tool to rotate the work. Though there are various types of tools in which the cutter rather than the work rotates, as for instance in a horizontal milling machine, prior practice has not permitted formation of irregular or contoured surfaces by such machines, but has limited their use to the formation of straight cylindrical surfaces, very simple tapered surfaces, and the like. All prior attempts to form more complexly contoured surfaces by such rotating cutter tools have apparently proven impractical or unsuccessful and have not been adopted by the machining industry.

SUMMARY OF THE INVENTION

The present invention provides a highly unique type of contouring attachment for use in equipment in which the cutting tool but not the workpiece is rotated. As will appear, this contouring unit is capable of following a template of virtually any desired configuration to form a correspondingly contoured bore or other surface of circular cross section on a workpiece. Thus, workpieces of very large size can be given intricate contours in machines much smaller than those conventionally employed for producing the same types of parts, since the usual necessity for bodily rotating the large workpiece is eliminated. Further, the equipment is extremely precise in following the contour of a controlling template, and requires no special alteration of the basic machine tool. The equipment is easily convertible between conditions for forming any of numerous different types of contours, merely by substituting changed templates in the apparatus.

Structurally, the apparatus includes a head which is driven rotatively by the spindle of the horizontal milling machine or other machine tool, and to which a cutter carrier is mounted for movement generally transversely of the axis of rotation of the head in a manner shifting a carried cutting tool toward and away from the axis of rotation. This generally radial movement of the cutter is controlled by the template and gives to the internal bore or external circular surface being formed a contour of any desired shape. A stylus assembly contacts and follows the template, and controls a powered actuating mechanism which moves the cutter carrier between its different possible positions. That actuating unit may for example be a piston and cylinder mechanism, and preferably turns with the rotating head. A valve or other control element actuated by the stylus controls delivery of pressure fluid or other power to the actuating mechanism.

Certain particular features of the invention relate to the provision of feed-back means responsive to the movement of the cutter carrier to transmit corresponding movement back to the stylus. These feed-back means desirably have a portion which rotates with the head, and which may coact with a non-rotating portion of the feed-back means leading to the stylus. More particularly, the feedback may be effective through a series of elements, desirably a series of balls, extending along a predetermined path and each acting to transmit motion to the next successive element or ball, with some of these balls contained within a guideway carried by and turning with the head, while others of the balls or elements are contained within a non-rotating guideway. The rotating and non-rotating balls or elements may meet at essentially the axis of rotation of the head, for optimum transmission of force therebetween and through the balls.

The power for turning the rotary head may be communicated to that head from the spindle of the machine tool through drive means carried by a non-rotating part mounted to the machine tool adjacent its spindle. This part may carry bearings mounting the head for its desired rotation, and may also carry gears or other power transmitting means for driving the head from the spindle.

BRIEF DESCRIPTION OF THE DRAWINGS

The above and other features and objects of the invention will be better understood from the following detailed description of the typical embodiment illustrated in the accompanying drawings in which:

FIG. 1 is a somewhat diagrammatic representation of a horizontal milling machine having a contouring attachment embodying the invention applied to the machine;

FIG. 2 is an exploded view showing the contouring attachment separated axially from the drive spindle of the milling machine;

FIG. 3 is an enlarged front view of the contouring head, taken on line 3—3 of FIG. 1;

FIG. 4 is a view similar to FIG. 3, but with the rotary head of the attachment shown as it appears when turned through 90° from the FIG. 3 position;

FIG. 5 is a side view taken on line 5—5 of FIG. 3;

FIG. 6 is an enlarged horizontal section taken on line 6—6 of FIG. 3;

FIG. 7 is a transverse section taken on line 7—7 of FIG. 6;

FIG. 8 is a fragmentary view taken on line 8—8 of FIG. 6;

FIG. 9 is an enlarged fragmentary section taken on line 9—9 of FIG. 6;

FIG. 10 is a fragmentary section taken on line 10—10 of FIG. 7;

FIG. 11 is an enlarged fragmentary section taken on line 11—11 of FIG. 3;

FIG. 12 is a fragmentary section taken on line 12—12 of FIG. 7;

FIG. 13 is a view showing a portion of FIG. 6, but with the rotary head turned through 180° from the FIG. 6 position, and FIG. 14 is a section taken on line 14—14 of FIG. 3.

DESCRIPTION OF THE PREFERRED EMBODIMENT

Referring first to FIG. 1, there is represented somewhat diagrammatically in that figure a conventional horizontal milling machine 10 to which there is mounted a contouring attachment or unit 11 for machining a surface of circular cross section on a workpiece represented at 12. During a machining operation utilizing the attachment 11, a rotary head portion 13 of that attachment is driven rotativly about a horizontal axis 14, with a carried cutting tool 15, while workpiece 12 is moved horizontally along axis 14, to machine either an internal bore within workpiece 12, or an external surface of circular cross section centered about axis 14. As the bore or external surface is formed, the cutter 15 is actuated toward and away from axis 14 in correspondence with the contoured guide surface 16 of a template 17, to give the machined surface a corresponding accurately controlled and predetermined contour. For example, there is shown in FIG. 6 a contoured internal bore 18 formed in this manner within workpiece 12.

To describe very briefly the typically illustrated milling machine 10, this machine includes a base 19 having two parallel ways 20 extending parallel to axis 14 and on which a carriage 21 is power actuable parallel to axis 14. This carriage 21 in turn has transverse ways 22 along which a table 23 is actuable transversely of axis 14, with the workpiece 12 being suitably secured to table 23 in fixed position relative thereto. The headstock 24 of the milling machine is movable upwardly and downwardly along vertical ways 25, and carries a conventional power driven spindle 26 (see FIG. 2), which turns about axis 14 as carriage 21 and workpiece 12 are slowly advanced along axis 14 by an appropriate powered drive mechanism timed with respect to the rotation of spindle 26. The spindle projects through a circular opening 27 in vertical wall 28 of headstock 24, and may externally have a first relatively large diameter cylindrical outer surface 29, a second somewhat reduced diameter external surface 30, and a third still smaller diameter relatively short external cylindrical surface 31 (see FIG. 6) with an outer transverse annular face 32. Internally, the spindle may have a straight cylindrical bore 33 for receiving retractable elements not used in conjunction with the present attachment. At two diametrically opposite locations, the axially outer ring portion 39 of the spindle formed by annular surfaces 31 and 32 may be cut away to form two keyways 34, within which two key elements 35 are received for positively keying a drive gear element 36 of the present attachment to the spindle.

The gear 36 contains an annular recess 38 which receives and fits closely about the axially outer ring portion 39 of the spindle. A number of screws 40 secure the gear rigidly to the spindle, with the axially outwardly projecting portions of keys 35 being received within keyway notches 37 in the gear. The gear teeth 41 formed on the outer surface of gear 36 act to drive rotary head 13 about axis 14 through a speed reduction gear train which will be described at a later point.

The head 13 of the apparatus of the present invention is mounted rotatably to a non-rotating stationary body structure 42 of the apparatus (see FIGS. 2, 3, and 5), which is secured rigidly to the vertical transverse wall 28 of headstock 24 about the location of spindle 26. As seen best in FIG. 6, this non-rotating body structure 42 may be formed sectionally to include a mounting ring 43 secured by screws 44' to wall 28, and disposed about the large diameter portion 29 of the spindle. Body structure 42 may also include a second part 44 which is generally annular except for the provision of a laterally projecting enlargement 45 at one side thereof, and which is rigidly secured to ring 43 by a series of circularly spaced screws or other fasteners 46 (see FIGS. 2 and 3). Within the interior of rotary head 13, part 44 forms an axially projecting essentially annular ring or boss 47 (FIG. 6), centered about axis 14, which has the axial sectional configuration illustrated in the right half of FIG. 6 except at the location of a gear 48 at which there is formed a recess 49 for receiving the gear. Head 13 forms two radially spaced axially inwardly projecting annular flanges 50 and 51, centered about axis 14 and located at the radially outer and radially inner sides of stationary projection 47, and engaging two annular ball-bearing assemblies 52 and 53 also centered about axis 14 to effectively mount head 13 for its desired rotation about that axis relative to portion 47 of the stationary body structure 42. The inner race of bearing assembly 53 may be retained within head 13 by a retaining ring 55, while the outer race of bearing 53 bears axially against stationary projection 47 through a transverse flange 56. Assembly 52 is held in position by a flange 57 formed on ring 47. Thus, the tightening of the single nut 55 on flange 51 secures head 13 very positively but rotatably to stationary body structure 42.

The gear train for turning head 13 in response to rotation of spindle 26 includes a gear 58 which is mounted rotatably to the non-rotating body 42 to turn about an axis 59 (FIG. 6) extending parallel to spindle axis 14. This gear 58 is journaled for such rotation by a ball-bearing assembly 60 contained within a recess in part 44, and a second ball-bearing assembly 61 contained within a recess formed in a part 62 which is suitably secured rigidly to part 44. Gear 58 meshes with gear 36 to be driven thereby, and in turn drives the previously mentioned gear 48 which is formed on the end of the shaft 63 of gear 58. Gear 48 engages a series of internal teeth 64 formed in a ring gear 65 centered about axis 14, with that ring gear being secured rigidly to rotary head 13 as by a number of circularly spaced screws 66, and being keyed rotatively thereto as by a key 67 retained by a screw 68.

Mounted to the forward face of rotary head 13, there is provided a transverse slide 69, guided for sliding movement within a transverse recess or guideway 80 in the head, and along an axis 70 (FIG. 6) disposed perpendicular to and intersecting main axis 14 of the apparatus. This slide may have the cross sectional configuration illustrated in FIG. 5, to present two oppositely directed parallel longitudinal flanges 70 extending along opposite sides of the slide and confined and guided by the spaced parallel inner edges 71 of two essentially semicircular flat retaining plates 72 suitably secured to two outer transverse generally semicircular surfaces 73 on head 13, as by a series of screws 74 represented in FIG. 3. Slide 69 may be of a length corresponding to the external diameter of rotary head 13, and may have arcuate end surfaces 75 which in a centered position of the slide are aligned with and form continuations of the outer cylindrical surface 76 of the head. An appropriate cutter mounting unit 77 is rigidly attached to slide 69, as by conventional T-bolts 78 received within T-bolts 79 in the slide (see FIG. 5), to carry the previously mentioned cutting tool 15 rigidly in fixed position on the slide.

For power actuating slide 69 and the carried cutter within the guideway 80 formed in head 13, there is provided an appropriate actuating mechanism, preferably taking the form of a piston and cylinder unit 81 (FIG. 6), whose cylinder 82 is secured by flanges 83 and screws 183 to head 13 at a location of partial reception within a recess 84 formed in the foward face of the head. A complementary but longer recess 85 formed in the inner surface of slide 69 receives the remainder of cylinder 82, with the piston rod 86 of mechanism 81 being connected rigidly to an end wall 87 of the slide, so that delivery of pressure fluid to and from opposite ends of the cylinder will serve to power actuate the slide in its opposite directions along axis 70 of the slide and of piston and cylinder mechanism 81.

The central portions of rotary head 13 and stationary section 42 of the apparatus include a number of parts of these two structures which meet at relatively rotatably transverse planar faces at the location 88 in FIG. 6. The parts which are stationary at this location includes a member 89 secured by screws 90 to part 44, an annular element 91 contained within a recess 92 in part 88, and two annular seal rings 93 and 94 which are urged axially by springs 95 into sealing engagement with a transverse annular planar surface 96 formed in transverse plane 97 on an annular part 98 which is carried by and turned with head 13. Part 91 is secured to part 89 in any appropriate manner, as by suitable circularly spaced screws or other fasteners (not shown).

The central elements which turn with head 13 include the mentioned part 98, and another part 99 which is essentially annular and centered about axis 14, and which has a transverse annular face meeting a correspondingly transverse annular face of part 89 at 100 in the previously mentioned plane 97. The parts 98 and 99 are suitably secured to head 19 in fixed position relative thereto, to turn with the head.

Pressurized actuating fluid is fed to and withdrawn from the opposite ends of piston and cylinder mechanism 81 from two annular grooves 101 and 102 formed in the transverse face 103 of part 91. Groove 101 communicates with the left end of the cylinder as viewed in FIG. 6 through a fitting 104, while the radially outer groove 102 communicates with the right end of the cylinder through passages 105 formed in parts 98 and 13. An annular fluid tight seal is formed radially between these two grooves 101 and 102 by a seal ring 106 received within a recess or groove in part 98 and spring urged axially against the transverse planar face 103 of part 91.

FIGS. 11 and 14 show the manner in which pressure fluid is delivered to and withdrawn from the two grooves 101 and 102 through a pair of fittings 107 and 108 (see FIG. 3) connected into the periphery of the stationary body structure 42. As seen in FIG. 11, fitting 107 communicates through passages 109 and 110 in parts 44 and 89 with groove 102, with a tube 310 typically being received in and lining passage 109 and being sealed by an appropriate seal element 111 preventing leakage of the fluid at the juncture between parts 44 and 89. Similarly, as seen in FIG. 14, the fitting 108 communicates with groove 101 through passages 112 and 113 in parts 44 and 89, and a tube 310' in passage 112.

The flow of pressure fluid, preferably a suitable pressurized hydraulic fluid, to and from the piston and cylinder mechanism through fittings 107 and 108 is controlled by a stylus assembly 409 of conventional construction typically illustrated as including a body section 410 and a downwardly projecting relatively deflectible element 411 whose lower end portion engages and is deflected by the contoured edge surface 112 of template 17. This template is of course rigidly secured to the axially movable table 23, or any other part which moves axially with workpiece 12, as by an appropriate bracket represented at 113 in FIG. 1. Stylus assembly 409 is carried by an elongated bar or member 114 which extends and is movable along a horizontal axis 115 disposed perpendicular to and intersecting main axis 14 of the machine. The body 410 of the stylus assembly is fixed relative to member 114, while the deflectible stylus element 411 acts upon very slight displacement by the template relative to elements 410 and 114, in a direction parallel to axis 115, to actuate a valve 210 within body 410 in a manner controlling the delivery of fluid to the piston and cylinder mechanism 81. More particularly, deflectible stylus element 411 has a central neutral position in which pressure fluid is neither admitted to nor withdrawn from either end of the piston and cylinder mechanism (full line position in FIG. 3), to thereby maintain the piston actuated slide 69 in a fixed position relative to rotary head 13; and also has two oppositely actuated positions to which element 411 can be pivotally deflected, as illustrated in exaggerated manner by the broken lines of FIG. 3. In one of those deflected positions, pressure fluid is admitted to a first end of the cylinder and withdrawn from the opposite end, to actuate the slide in a first direction until the stylus element 411 returns to its central neutral position relative to body 410; while in the second actuated condition the connections are reversed to cause movement of the slide in the opposite direction. Appropriate flexible lines extend between the valve mechanism within stylus body 410 and fittings 107 and 108, as well as a suitable pressurizing pump 116 and reservoir 117 represented diagrammatically in FIG. 3. As will be understood, the actual pivotal or other displacement of the stylus element 411 relative to body 410 is very minute, say for example as small as or less than 0.001 inch, to render the apparatus fully and precisely responsive to the irregularities on template 17.

To apprise the stylus controlled valve 210 of the movements of slide 69 by the piston and cylinder mechanism, a unique feedback mechanism is provided, including a series of preferably identical rigid spherical balls 118 which cause longitudinal movement of member 114 in exact correspondence with the longitudinal sliding movement of slide 69, and which do so in spite of the fact that the slide rotates while member 14 does not. These balls 118 are confined for movement along the curving path illustrated in FIG. 6, with one end ball engaging and moving in correspondence with a projection 119 which is attached rigidly to slide 69 and projects therefrom to a position of engagement with the end surface of that end ball. The other end ball engages a similar projection 120 carried by and rigidly secured to member 114. To define the path of movement of the balls, it may first be noted that an end group of the balls near projection 119 of the slide are received within a cylindrical passageway 121 formed in a part 122 which is secured by suitable screws 123 or other fasteners to head 13, within a recess 124 formed in that head (see FIGS. 6 and 9). This passageway 121 in part 122 extends parallel to the axis of movement of the slide, and is long enough to always contain at least one of the balls in every position of the slide.

From the right end of passage 121, as seen in FIG. 6, the balls advance into and through a passage 125 formed in part 99, which passage curves progressively through 90 degrees to extend directly along axis 14 at 126 as the passageway reaches the transverse plane 97 at which the central rotating and non-rotating parts of sections 42 and 13 meet. This directly axial portion 126 of passage 125 meets and forms a continuation of a corresponding directly axial portion of a curving passage 127 formed in part 89 which gradually curves through 90 degrees to extend directly radially at 128, and lead the balls into communicating corresponding radial passages 129 and 130 in part 44 and a part 131 rigidly secured to part 44. As seen in FIG. 12, the passage 130 communicates through a slot 132 with a guideway 133 within which member 114 is movable, to allow extension through slot 132 of the previously mentioned projection 120 for engagement with the end ball. As in the case of passageway 121, at least one of the balls of the series is always received within the directly radial portion of the ball guideway formed at 129 and 130, so that the end ball moves only directly parallel to the axis of movement of member 114.

Arm 114 is yieldingly urged to the left in FIG. 6, to take up any play between the balls. For this purpose, there may be provided a coiled clock type spring 134 (FIGS. 6 and 10), mounted within a housing 135 secured to part 44, and having one of its ends secured to a stationary pin 136 while its opposite end is connected to and urges rotatably a gear 137 turning about an axis 138 and meshing with a rack 139 secured in fixed relation to member 114. This spring will of course allow movement of member 114 rightwardly as viewed in FIG. 6 under the influence of piston and cylinder mechanism 81, but has sufficient force to return member 114 leftwardly upon reverse movement of the piston and cylinder mechanism. Member 114 is guided for its desired movement only along axis 115 by suitable bearing plates 140 and ball bearings 141 as represented in FIGS. 10 and 12.

To now describe a cycle of operation of the illustrated apparatus, assume that workpiece 12 has been mounted on table 23 of FIG. 1, and has an initially cylindrical bore which is to be enlarged to a contoured configuration as illustrated at 18 in FIG. 6 under the control of template 17. The operator energizes the driving and control mechanism of machine tool 10 to commence rotation of spindle 26 about axis 14, and at the same time to commence timed gradual advancement of table 23 and the workpiece 12 along axis 14. The rotation of the spindle acts through gears 36, 58, 48, and 65 to commence rotation of head 13 and the carried slide 69 and cutter element 15 at a reduced speed about axis 14, at a proper rate to effectively machine the internal surface 18 within the workpiece as the latter is advanced axially. Whenever the contour of template 17 causes very slight deflection of stylus element 411 (say to the left in FIG. 6), this deflection from an initial central and neutral position (full line position of FIG. 3) causes the stylus actuated valve within body 410 to deliver pressure fluid to one end of the piston and cylinder mechanism 81 and discharge fluid from the opposite end, to cause the piston and cylinder mechanism to commence movement of the slide and cutting tool in a predetermined direction. This movement of the slide is fed back through balls 118 to member 114, which thereby causes corresponding bodily displacement of the non-deflectible section 410 of the stylus assembly. When the stylus assembly reaches a position in which the deflectible element 411 is again in its initial neutral position relative to body 410, the flow of pressure fluid to and from the piston and cylinder mechanism is halted, and the slide is therefore maintained in that changed setting until further deflection of the stylus element by the template, whcih further deflection is again followed by corresponding movement of the slide, etc., so that the contour machined in workpiece 12 corresponds closely and accurately to the contour of the stylus deflecting edge of the template. When the configuration of the stylus actuating cam surface on the template is such as to allow rightward movement of the deflectible element 411 in FIG. 6, beyond the normal neutral position of that element, such deflection of element 411 may be produced by appropriate spring means or other means contained within the stylus assembly, in conventional manner, to thereby commence movement of the slide in a direction the opposite of that discussed above.

In any particular position of the slide and stylus, the balls which are received within the rotating head elements 13, 122, and 99 all turn with the head about axis 14, while the remainder of the balls do not rotate, and yet because of the manner in which the rotating and non-rotating balls meet at axis 14, the feedback motion is transmitted very effectively and precisely between the rotating and non-rotating parts.

While a certain specific embodiment of the present invention has been disclosed as typical, the invention is of course not limited to this particular form, but rather is applicable broadly to all such variations as fall within the scope of the appended claims.

I claim:

1. A contouring unit for a machine tool having a power driven spindle and a template; said unit comprising a head adapted to be driven rotatively about an axis by said power driven spindle of said machine tool, a cutter carrier for holding a cutter at a location to machine a workpiece and mounted for rotation with said head and for movement relative thereto closer to or farther from said axis to form a contoured surface on the workpiece, powered actuating means for moving said cutter carrier to shift a cutter closer to or farther from said axis relative to said head, stylus means for following the contour of said template and operable to control said actuating means in a relation causing said cutter carrier to machine on said workpiece a surface of circular cross section contoured in correspondence with the template, and feed-back means responsive to movements of the cutter carrier relative to the head to actuate said stylus means in accordance therewith, said feed-back means having a portion which is not part of said actuating means and which turns with said head and transmits feedback motion of said cutter carrier toward the stylus means but does not transmit the driving power of said actuating means to said carrier.

2. A contouring unit for use with a machine tool, comprising a head adapted to be driven rotatably about an axis by a power driven spindle of said tool, a cutter carrier mounted by said head for rotation therewith and for movement relative thereto closer to or farther from said axis, means for power actuating said cutter carrier relative to said head in correspondence with the contour of a template, and feed-back means associated with said last mentioned means for producing a feed-back of the motion of said cutter carrier, said feed-back means including a series of balls extending and movable along a predetermined path and each transmitting motion longitudinally of said path to the next successive one of said balls, some of said balls being carried by said head for rotation therewith, while others of said balls do not rotate with the head.

3. A contouring unit as recited in claim 2, in which said rotating and non-rotating balls meet at essentially said axis, there being a guideway carried by and turning with said head and containing the rotating balls, and a non-rotating guideway containing and guiding the non-rotating balls.

4. A contouring unit for a machine tool having a power driven spindle and a template; said unit comprising a head adapted to be driven rotatively about an axis by said power driven spindle of said machine tool, a cutter carrier for holding a cutter at a location to machine a workpiece and mounted for rotation with said head and for movement relative thereto closer to or farther from said axis to form a contoured surface on the workpiece, powered actuating means for moving said cutter carrier to shift a cutter closer to or farther from said axis relative to said head, stylus means for following the contour of said template and operable to control said actuating means in a relation causing said cutter carrier to machine on said workpiece a surface of circular cross section contoured in correspondence with the template, and feed-back means having a portion turning with said head and responsive to movements of the cutter carrier relative to the head to actuate said stylus means in accordance therewith, said feed-back means including a series of balls extending and movable along a predetermined path and each transmitting motion longitudinally of said path to the next successive ball in said series so that all of the balls act together to transmit motion from said cutter carrier to said stylus means.

5. A contouring unit as recited in claim 4, in which said head forms a passageway which turns with the head about said axis and through which some of said balls extend along a portion of said path to a location essentially at said axis, said unit including a non-rotating part containing a non-rotating passageway forming a continuation of said first mentioned passageway and meeting it essentially at said axis and containing others of said balls in a relation transmitting motion through said series of balls from said cutter carrier to said stylus means while some of the balls rotate with said head and others of the balls do not rotate.

6. A contouring unit as recited in claim 4, in which said head forms a passageway which turns with the head about said axis and through which some of said balls extend along a portion of said path to a location essentially at said axis, said unit including a non-rotating part containing a non-rotating passageway forming a continuation of said first mentioned passageway and meeting it essentially at said axis and containing others of said balls in a relation transmitting motion through said series of balls from said cutter carrier to said stylus means while some of the balls rotate with said head and others of the balls do not rotate, and power transmitting means carried by said non-rotating part and driven by said spindle of said machine tool and acting to turn said head about said axis.

7. A contouring unit as recited in claim 4, in which said head forms a passageway which turns with the head about said axis and through which some of said balls extend along a portion of said path to a location essentially at said axis, said unit including a non-rotating part containing a non-rotating passageway forming a continuation of said first mentioned passageway and meeting it essentially at said axis and containing others of said balls in a relation transmitting motion through said series of balls from said cutter carrier to said stylus means while some of the balls rotate with said head and others of the balls do not rotate, means for stationarily securing said non-rotating part to a non-rotating portion of said machine tool and at a location disposed essentially about the rotating spindle of the tool, and gears carried by said non-rotating part and driven by the spindle and acting to rotate said head about said axis.

8. A contouring unit as recited in claim 7, in which said stylus means include a first element carried by said nonrotating part and actuated by said series of balls in correspondence with movement of said cutter carrier relative to said head, and a second element mounted for limited displacement relative to said first element by said template.

9. A contouring unit as recited in claim 8, including a power controlling unit operable by said second element of the stylus means and energizing said actuating means to displace said cutter carrier in correspondence with movement of said second element of the stylus means relative to said first element of the stylus means.

10. A contouring unit as recited in claim 8, in which said actuating means include a piston and cylinder mechanism carried by and rotating said head and operable to displace said cutter carrier transversely of said axis, there being valve means actuable by said second element of the stylus means and controlling the delivery of pressure fluid to said piston and cylinder mechanism in response to movements of said second element of the stylus means relative to said first element of the stylus means by said template.

11. The combination comprising a machine tool having a power driven spindle, and a contouring unit as recited in claim 10, mounted on said tool.

12. A contouring unit for use with a machine tool having a power driven spindle and a template; said unit comprising a head adapted to be driven rotatably about an axis by said power driven spindle of said tool; a cutter carrier mounted by said head for rotation therewith and for movement relative thereto closer to or farther from said axis; and means responsive to the contour of said template and operable to power actuate said cutter carrier toward or away from said axis and relative to said head in correspondence with the template contour; said last mentioned means including feed-back means for producing a feedback of the motion of said cutter carrier for controlling the extent of said motion; said feed-back means including a series of elements extending and movable along a predetermined path and each transmitting feedback motion longitudinally of said path to the next successive one of said elements; some of said elements, which are beyond a predetermined point in said path in a first direction, being carried by said head for rotation therewith; and others of said elements, beyond said point in the opposite direction, being retained against rotation with the head; individual ones of said elements being movable past said point in the path as the series of elements move along the path, so that a particular one of the elements may in one position be in the group which turn with the head and in another position be in the group which are retained against rotation with the head.

13. The combination comprising a machine tool having a power driven spindle, and a contouring device as recited in claim 12 mounted on said tool.

14. A contouring unit for a machine tool having a power driven spindle and a template; said unit comprising a head adapted to be driven rotatively about an axis by said power driven spindle of said machine tool, a cutter carrier for holding a cutter at a location to machine a workpiece and mounted for rotation with said head and for movement relative thereto closer to or farther from said axis to form a contoured surface on the workpiece, powered actuating means for moving said cutter carrier to shift a cutter closer to or farther from said axis relative to said head, stylus means for following the contour of said template and operable to control said actuating means in a relation causing said cutter carrier to machine on said workpiece a surface of circular cross section contoured in correspondence with the template, and feed-back means having a portion turning with said head and responsive to movements of the cutter carrier relative to the head to actuate said stylus means in accordance therewith, said feedback means including a series of elements extending and movable along a predetermined path and each transmitting feedback motion longitudinally of said path to the next successive one of said elements; some of said elements, wich are beyond a predetermined point in said path in a first direction, being carried by said head for rotation therewith; and others of said elements, beyond said point in the opposite direction, being retained against rotation with the head; individual ones of said elements being movable past said point in the path as the series of elements move along the path, so that a particular one of the elements may in one position be in the group which turn with the head and in another position be in the group which are retained against rotation with the head.

15. A contouring unit as recited in claim 14, in which said actuating means include a piston and cylinder mechanism carried by and rotating with said head, there being valve means actuable by said stylus means to control the delivery of pressure fluid to said piston and cylinder mechanism in response to actuation of the stylus means by said template.

16. A contouring unit as recited in claim 14, including a non-rotating part to be mounted to said machine tool adjacent said power driven spindle thereof, and power transmitting means carried by said non-rotating part and transmitting power from said spindle to said head to rotate the latter.

17. A contouring unit as recited in claim 14, including a non-rotating part adapted to be mounted to said machine tool adjacent said power driven spindle thereof, and bearing means mounting said head rotatably to said non-rotating part.

18. A contouring unit as recited in claim 14, including a non-rotating part adapted to be mounted to said machine tool adjacent said power driven spindle thereof, bearing means mounting aaid head rotatably to said non-rotating part, and gears carried by said non-rotating part and driven by said spindle and driving said head about said axis.

19. A contouring unit as recited in claim 18, in which said actuating means include a piston and cylinder mechanism carried by and rotating with said head, there being valve means actuable by said stylus means to control the delivery of pressure fluid to said piston and cylinder mechanism in response to actuation of the stylus means by said template.

* * * * *